United States Patent [19]

Tanaka et al.

[11] Patent Number: 4,462,377
[45] Date of Patent: Jul. 31, 1984

[54] EXHAUST GAS RECIRCULATION DEVICE

[75] Inventors: Takeshi Tanaka; Hisasi Kawai, both of Toyohashi; Toshihiko Igashira, Toyokawa; Kiyonori Sekiguchi, Aichi; Takaharu Idogaki, Okazaki, all of Japan

[73] Assignee: Nippon Soken, Inc., Nishio, Japan

[21] Appl. No.: 451,052

[22] Filed: Dec. 20, 1982

[30] Foreign Application Priority Data

Dec. 19, 1981 [JP] Japan ................................. 56-204534

[51] Int. Cl.³ ............................................. F02M 25/06
[52] U.S. Cl. ..................................... 123/571; 123/569
[58] Field of Search ................................. 123/571, 569

[56] References Cited

U.S. PATENT DOCUMENTS 4,130,094 12/1978 Gropp .................................. 123/571
4,399,799 8/1983 Romblom et al. .................. 123/571
4,411,242 10/1983 Igashira et al. .................. 123/571 X Primary Examiner—Wendell E. Burns
Attorney, Agent, or Firm—Cushman, Darby & Cushman

[57] ABSTRACT

An EGR device for an internal combustion engine, including an EGR valve body in an EGR pipe for changing the opening degree of the EGR pipe for regulating the amount of the recirculated exhaust gas, a diaphragm supported by casing of the EGR valve and connected to the EGR valve body for forming a negative pressure chamber, and a solenoid fixed to a sleeve of one of the casing for driving a spool valve in the direction to the diaphragm when the solenoid is excited. The excitation of the solenoid is controlled by a control circuit in accordance with the running conditions of the internal combustion engine.

1 Claim, 3 Drawing Figures

EXHAUST GAS RECIRCULATION DEVICE

BACKGROUND OF THE INVENTION

1. Field of the Invention

The present invention relates to an exhaust gas recirculation (EGR) device for an internal combustion engine, such as a diesel engine for an automobile.

2. Description of the Prior Art

In general, EGR is carried out in order to reduce the amount of $NO_x$ in the exhaust gas of a diesel engine. Since excessive EGR causes smoke, it is desirable to control the EGR precisely in accordance with the engine running conditions.

It has been known that since the difference between the upstream pressure and the downstream pressure of the EGR valve of a diesel engine is smaller than that of a gasoline engine and since the range of control of the amount of EGR is relatively large, the precision of control of the opening degree of the EGR required for a diesel engine is not particularly high and, accordingly, the structure of EGR system can be considerably simplified.

In the prior art system, the engine rotational speed and the engine load are detected by sensors, an electric actuator is driven by signals from the sensors, and negative pressure regulated by the action of the electric actuator is led to a diaphragm chamber of the EGR valve for suitable control of EGR.

In this system, electric control signals are converted into changes of the opening degree of the EGR valve by means of a constant pressure valve with a solenoid and an EGR valve with a diaphragm chamber.

The prior art system of EGR of a diesel engine, however, is not satisfactorily simplified in structure.

SUMMARY OF THE INVENTION

It is the object of the present invention to provide an improved EGR device, for an internal combustion engine, having a relatively simple structure, in which the number of the structural elements is reduced, thereby enabling the reduction of manufacturing costs.

In accordance with the present invention, there is provided an EGR device for an internal combustion engine comprising: an EGR pipe which forms a passage between an intake pipe and an exhaust pipe of the engine, for supplying a portion of the exhaust gas to the intake pipe; an EGR valve body in the EGR pipe for changing the opening degree of the EGR pipe and regulating the amount of the recirculated exhaust gas; casings of an EGR valve fixed to the EGR pipe; a diaphragm supported by the casings and connected to the EGR valve body for forming a negative pressure chamber; a sleeve extended from one of the casings; a spool valve body movably fitted in the sleeve; an atmospheric port and a negative pressure port formed in the sleeve, the negative pressure port being connected to a negative pressure source; a channel formed in the spool valve body, one port of the channel being open to the negative pressure chamber, while the other port of the channel being communicated with either the atmospheric port or the negative pressure port according to the position of the spool valve body; a spring in the negative pressure chamber arranged between the diaphragm and the spool valve body for forcing the spool valve body in the direction to realize communication of the other port of the channel with the atmospheric port; a solenoid fixed to the sleeve for driving the spool valve in the direction to the diaphragm when the solenoid is excited; and a control circuit for controlling the excitation of the solenoid in accordance with the engine running conditions.

DESCRIPTION OF THE PREFERRED EMBODIMENTS

Figure 1:
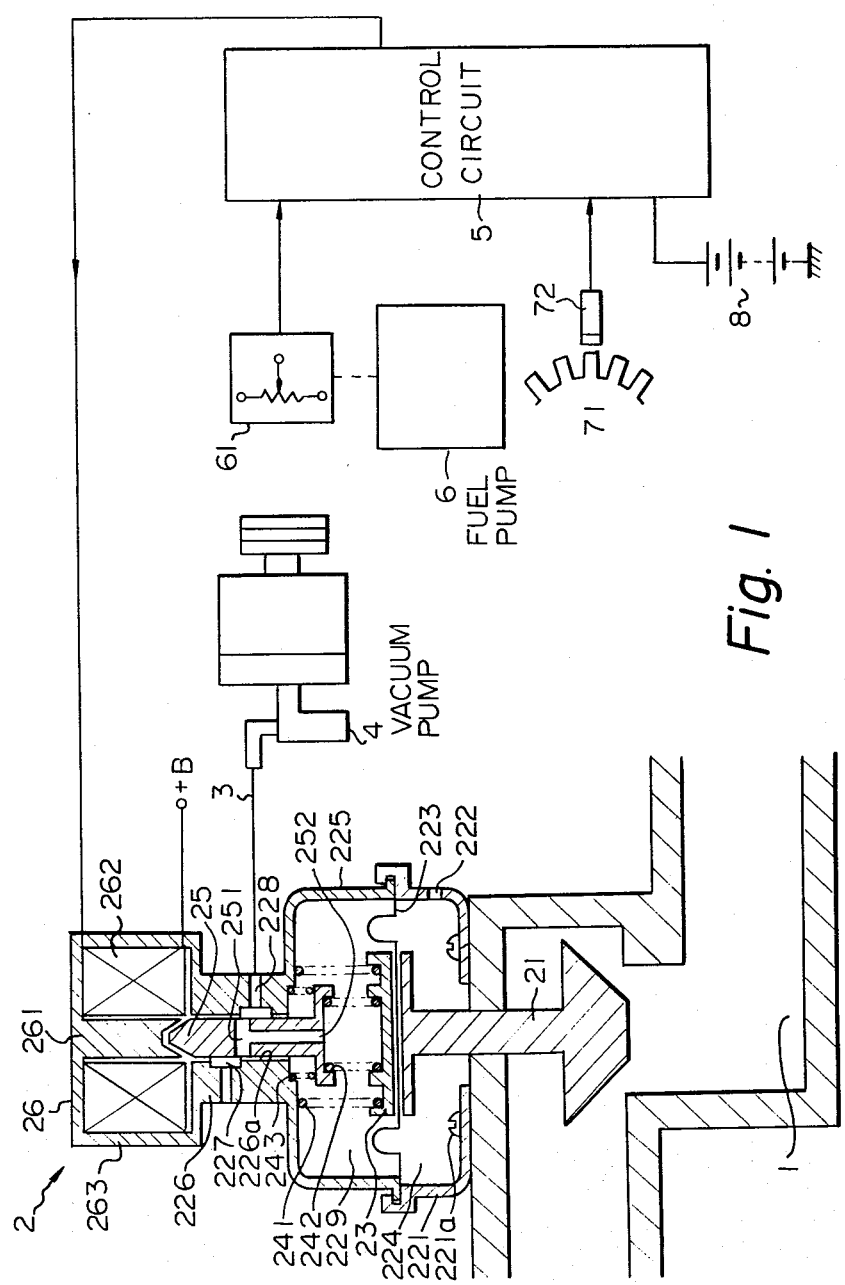
FIG. 1 illustrates an EGR device for an internal combustion engine according to an embodiment of the present invention.

An EGR device for an internal combustion engine as a preferred embodiment of the present invention is illustrated in FIG. 1. The EGR device of FIG. 1 includes an EGR valve 2, a vacuum pump 4, a fuel pump 6, a variable resistor 61 coupled to a fuel control shaft of the fuel pump 6, an electromagnetic pick-up 72 for detecting the rotaitional speed of the engine, a control circuit 5, and a battery 8.

The EGR value 2 is provided in an EGR pipe 1 which forms a passage between an intake pipe and an exhaust pipe of the engine. The EGR valve 2 includes a valve body 21, a diaphragm 223, a lower casing 221, an upper casing 225, a valve spring 241, a spool valve 25, and a solenoid 26. The valve body 21 is adapted to move upward or downward in association with the diaphragm 223. When the lift of the valve body 21 is zero, the EGR pipe 1 is closed by the valve body 21.

A negative pressure chamber 229 is formed by the upper casing 225 and the diaphragm 223. A spring seat 23 and the valve body 21 are fixed to the upper and the lower surfaces of the diaphragm 223. The valve spring 241 is provided between the spring seat 23 and the casing 225 in the negative pressure chamber 229 so that the valve spring 241 presses the diaphragm downward. A sleeve 226 is provided at the center of the casing 225 and the spool valve 25 is slidably fitted into a bore 226a formed in the sleeve. An atmospheric port 227 which is open to the atmosphere and a negative pressure port 228 which is communicated with the vacuum pump 4 are provided in the upper portion of the sleeve 226. A channel 251 which is adapted to be communicated with either the atmospheric port 227 or the negative pressure port 228 is provided in the spool valve 25. The channel 251 is communicated through a port 252 with the negative pressure chamber 229. The lower end of the spool valve 25 is supported between a spring 242 and a spring 243. The other end of the spring 242 is supported by the spring seat 23. The other end of the spring 243 is supported by the casing 225. A coil casing 263 having a core 261 of the solenoid 26 at the center thereof is provided on the top of the sleeve 226. The coil casing 263, the core 261, and the upper portion of the spool valve are made of ferromagnetic material. One terminal of a solenoid coil 262 is connected to the control circuit 5, while the other terminal is connected to a positive terminal of a battery.

The upper casing 225 is fixed to the lower casing 221 together with the diaphragm 223 by caulking. The EGR valve 2 is fixed to the EGR pipe 1 by fixing the lower casing 221 to the EGR pipe 1 by screws 221a. A space 224 formed by the diaphragm 223 and the lower casing 221 is communicated with the atmosphere through an opening 222.

When a current is supplied to the solenoid coil 262, the spool valve 25 is pulled upward in response to the intensity of the current, to the position where the electromagnetic force by the current and the counter-force of the spring 243 are balanced. In accordance with this upward pull of the spool valve 25, the communicating area between the channel 251 and the atmospheric port 227 is increased, while the communicating area between the channel 251 and the negative pressure port 228 is decreased.

The vacuum pump 4 is of a well-known structure. The intake opening of the vacuum pump 4 is communicated with the negative pressure port 228 through a conduit pipe 3. The variable resistor 61 and the electromagnetic pick-up 72 are connected to the control circuit 5.

Figure 2:
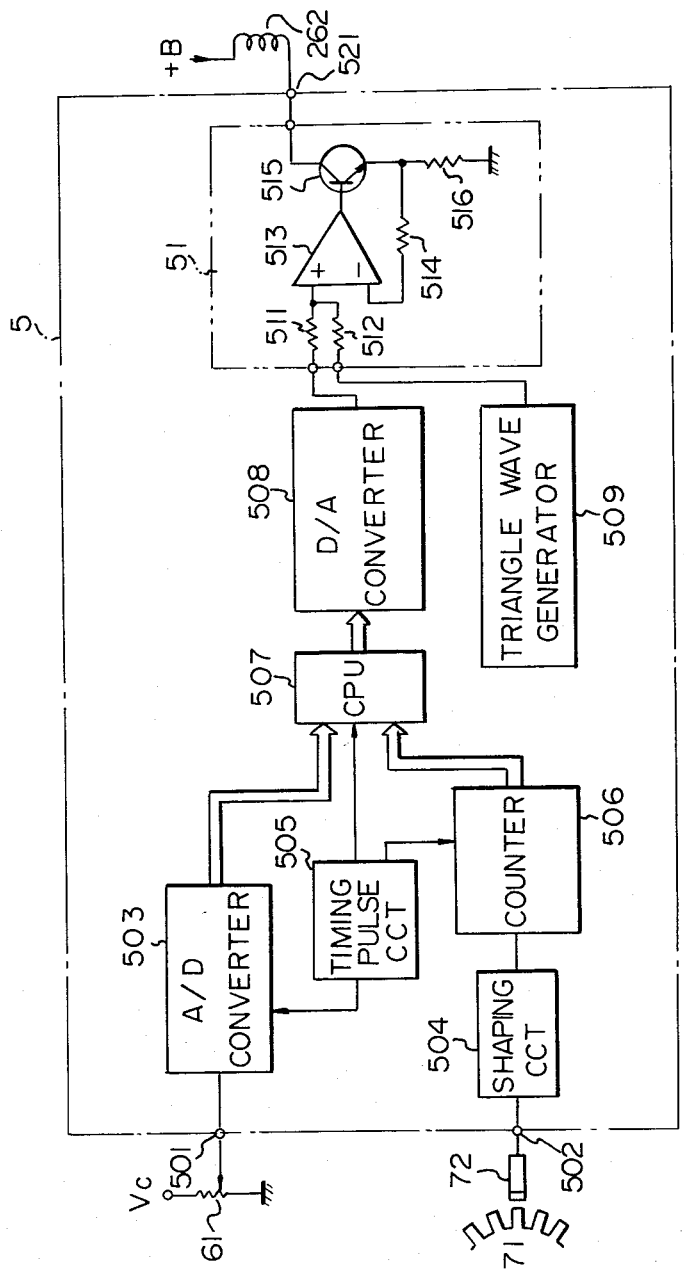
FIG. 2 illustrates the structure of the control circuit in the device of FIG. 1.

The structure of the control circuit 5 is illustrated in FIG. 2. The input terminal 501 is connected to the output terminal of the variable resistor 61. One of the fixed terminals of the variable resistor 61 is connected to the voltage source $V_c$, while the other fixed terminal is grounded. The input terminal 502 is connected to the output terminal of the electromagnetic pick-up 72. The output terminal 521 is connected to one terminal of the coil 262 of the solenoid 26. The other terminal of the coil 262 is connected to the positive pole (+B) of a battery.

The analog-digital (A/D) converter 503 includes a scaling amplifier, an A/D conversion element, a memory, and a timing pulse generating circuit for generating an A/D conversion start signal and a latch signal for the memory. The A/D converter 503 produces an output signal of 8 bits.

A shaping circuit 504 is connected to the input terminal 502. The shaping circuit 504 shapes the signal from the electromagnetic pick-up 72.

A timing pulse circuit 505 determines the timing of A/D conversion of the A/D converter 503, the timing of counting of a counter 506, and the timing of data input of a central processing unit (CPU) 507. The timing pulse circuit 505 includes an oscillator, a counter, and a logic circuit. The counter 506 includes a counter circuit for counting the number of the output pulses from the shaping circuit 504, a memory for storing the counted number, and a timing pulse generating circuit for receiving the signal from the timing pulse circuit 505 and generating a timing signal for controlling the counting and a latch signal for controlling the memory. The counter 506 produces a binary code signal of 8 bits.

The CPU 507 includes a calculation circuit; an interface circuit for connecting the output signal of the A/D converter 503, the output signal of the counter 506, the output signal of the timing pulse circuit 505, and the bus line of the calculation circuit; and a memory circuit for storing the output data of the calculation circuit.

A microcomputer can be used for the above described calculation circuit. For example, a TLCS-12A type microcomputer manufactured by Tokyo Shibaura Electric Co. can be used. The microcomputer of this type, which uses an internal clock frequency (2MHz) signal, carries out the initialization when the power source is switched on and, then, starts operation from the commanded address of a read only memory (ROM).

The CPU 507 produces a binary code signal of 8 bits which is supplied to a D/A converter 508. For example, a converter of the ladder network of the R-2R type can be used for the D/A converter 508.

A triangle wave generator 509 is provided for producing a triangle wave signal coupled with the output signal of the D/A converter 508. The triangle wave generator 509 produces a triangle wave signal of, for example, 200 Hz. The output signals of the D/A converter 508 and the triangle wave generator 509 are supplied to a driving circuit 51.

In the driving circuit 51, a reisitor 511 is connected to the output terminal of the D/A converter 508 with one terminal and to the non-inverting input terminal of an operational amplifier 513 with the other terminal. A resistor 512 is connected to the output terminal of the triangle wave generator 509 with one terminal and to the non-inverting input terminal of the operational amplifier 513 with the other terminal. The output terminal of the operational amplifier 513 is connected to the base of an NPN transistor 515. The emitter of the transistor 515 is connected to one terminal each of a resistor 514 and a resistor 516. The other terminal of the resistor 516 is grounded. The other teminal of the resistor 514 is connected to the inverting input terminal of the operational amplifier 513. The collector of the transistor 515 is connected to the output terminal 521 of the control circuit 5.

The operation of the control circuit 5 will be described below. First, the A/D converter 503 carries out the A/D conversion and outputs the stored data upon receipt of a start signal from the timing pulse circuit 505. Approximately simultaneously, the counter 506 counts the number of pulses from the shaping circuit 504 and outputs the stored data upon receipt of a count start signal from the timing pulse circuit 505.

Figure 3:
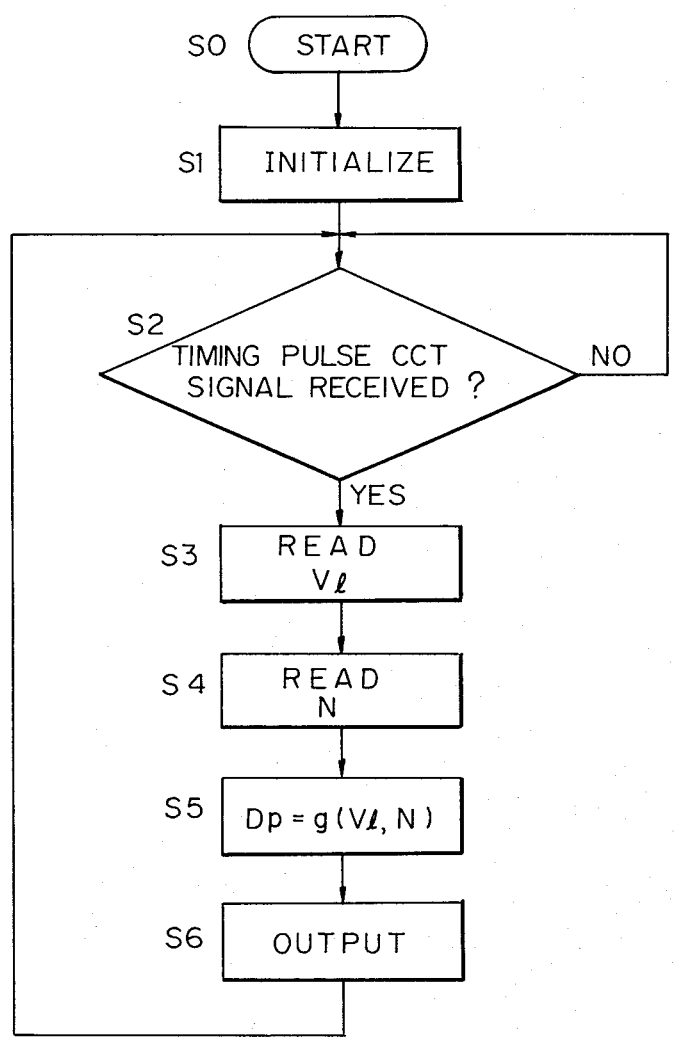
FIG. 3 illustrates the flow chart of the operation of the control circuit of FIG. 2.

The operation of the CPU 507 will be described with reference to the flow chart of FIG. 3. In step S0, the operation of the control circuit 5 is started upon switching on of the power source. In step S1, the entire memory in the CPU 507 is initialized. In step S2, timer checking is carried out in which the decision as to whether or not the signal from the timing pulse circuit 505 is received is carried out. The output pulse of the timing pulse circuit 505 is of the pulse of 20 Hz, the waveform of which pulse has a HIGH level for approximately 0.2 ms period and a LOW level for the remaining period. Thus, in step S2, the decision as to whether or not the HIGH level portion of the pulse is received is carried out.

When the decision of step S2 is NO, the process goes back to step S2. When the decision is YES, the process proceeds to step S3. Since the decision can be performed in approximately 50 μs, the pulse width of 0.2 ms is sufficient for performing the decision.

In step S3, the value $V_l$ of the opening of the pump, which is stored in the memory in the A/D converter 503, is read. In step S4, the value N of the engine rotational speed, which is stored in the memory in the counter circuit 506, is read. In step S5, an EGR amount is taken in from a map in which EGR amounts are predetermined corresponding to the opening $V_l$ of the pump and the engine rotational speed N. The taken-in EGR amount is interpolated to obtain the value $D_p$.

The binary code signal from the CPU 507 is converted into the corresponding analog voltage by the D/A converter 508. In the driving circuit 51, the current passing through the transistor 515 is controlled so that the voltage applied to the non-inverting input terminal of the operational amplifier 513 is equal to the voltage of the connection point of the resistor 516 and the transistor 515. The driving circuit 51 is a kind of constant current circuit. The resistor 516 serves as a current-detecting resistor.

The reason why the triangle wave signal from the triangle wave generator 509 is supplied to the non-inverting input terminal of the operational amplifier 513 through the resistor 512 is as follows. The characteristic of the movement of the stroke of the spool valve 25 with regard to the current through the solenoid coil 262 is of the hysteresis nature due to the friction between the spool valve 25 and the solenoid casing 263. It is necessary to reduce the unfavorable effect of this characteristic. Thus, the triangle wave signal is superposed on the output signal of the D/A converter 508. The triangle wave signal has a frequency of approximately 300 Hz.

The negative pressure transmitted from the vacuum pump 4 is not of a constant value under specific rotational speeds of the engine and the like. However, the negative pressure of the negative pressure chamber 229 is determined solely by the value of the current through the solenoid coil 262.

The reason for such determination will be explained below. Let us consider the balance between the forces exerted on the spool valve. The sum of the electromagnetic force $F_m$ pushing the spool valve upward and the product $P \cdot A$ of the difference P between pressures of both sides of the diaphragm 12 and the effective area A of the diaphragm 12 is equal to the counterforce $F_s$ of the spring, that is:

$$F_m + P \cdot A = F_s \tag{1}$$

The counterforce $F_s$ of the spring is expressed by the following equation (2), where the preset load of the spring is $F_{sp}$, the upward displacement of the spool valve is X, and the spring constant of the spring is k.

$$F_s = K \cdot X + F_{sp} \tag{2}$$

From equation (1) and (2), the following relationship is obtained.

$$F_m + P \cdot A = K \cdot X + F_{sp}$$

$$P \cdot A = K \cdot X + F_{sp} - F_m$$

$$P = (K \cdot X + F_{sp} - F_m)/A \tag{3}$$

The value X varies as the negative pressure from the vacuum pump 4 varies. However, if the values $F_{sp}$ and $F_m$ are selected fargreater than the value $K \cdot X$, the value P is determined solely by the values $F_{sp}$ and $F_m$.

In the operation of the device of FIG. 1, the desired rate of EGR can be realized by memorizing the value $F_m$ corresponding to the value of the rate of EGR.

In the operation of the device of FIG. 1, even when the value $F_m$ varies suddenly due to sudden changes of the running conditions, the pressure of the negative pressure chamber can comply immediately with the changed conditions. The reason is that when the pressure of the negative pressure chamber is different from the pressure which is balanced with the changed value of $F_m$, the spool valve is moved so as to chang simultaneously both communication areas with the negative pressure port and with the atmospheric port. Hence, the change of the pressure of the negative pressure chamber takes place very quickly compared with the case in which the change of the pressure is carried out only by the flow through a fixed orifice.

In the device of FIG. 1, the use of the spool valve makes it possible to control a large amount of air when such control is needed so that the speed of response of the device is increased. In the device of FIG. 1, the spool valve operates as a valve for a constant pressure difference, hence the pressure change of the vacuum pump is absorbed so that high precision control of the device is realized.

We claim:

1. An EGR device for an internal combustion engine comprising:

an EGR pipe which forms a passage between an intake pipe and an exhaust pipe of the engine, for supplying a portion of the exhaust gas to the intake pipe;

an EGR valve body in said EGR pipe for changing the opening degree of said EGR pipe and regulating the amount of the recirculated exhaust gas;

casing means fixed to said EGR pipe;

a diaphragm supported by said casing means and connected to said EGR valve body for forming a negative pressure chamber;

a bore-formed in said casing means;

a spool valve body movably fitted in said bore;

an atmospheric port and a negative pressure port formed in said casing means, said negative pressure port being connected to a negative pressure source;

a channel formed in said spool valve body, one port of said channel being open to said negative pressure chamber, while the other port of said channel being communicated with either said atmospheric port or said negative pressure port according to the position of said spool valve body;

a spring in said negative pressure chamber arranged between said diaphragm and said spool valve body for forcing said spool valve body in the direction to realize the communication of said other port of said channel with said atmospheric port;

a solenoid fixed to said casing means for driving said spool valve in the direction to said diaphragm when said solenoid is excited; and a control circuit for controlling the excitation of said solenoid in accordance with the engine running conditions.

* * * * *